United States Patent [19]

Hann, Sr.

[11] Patent Number: 4,950,399
[45] Date of Patent: Aug. 21, 1990

[54] SIDE SEAL FOR A LIQUID FILTER DEVICE
[75] Inventor: Wayne D. Hann, Sr., Peapack, N.J.
[73] Assignee: Komline-Sanderson Engineering Corporation, Peapack, N.J.
[21] Appl. No.: 382,382
[22] Filed: Jul. 20, 1989
[51] Int. Cl.⁵ .......................................... B01D 33/048
[52] U.S. Cl. ................................ 210/232; 210/400; 198/836.1; 209/272
[58] Field of Search ............... 210/232, 400, 401, 406, 210/DIG. 3; 198/836; 209/272, 307, 363; 162/353; 52/222, 273; 49/482, 493

[56] References Cited

U.S. PATENT DOCUMENTS

| | | | |
|---|---|---|---|
| 3,024,893 | 3/1962 | Lambert | 198/836 |
| 3,344,909 | 10/1967 | Hansen et al. | 198/836 |
| 3,464,563 | 9/1969 | Dahlem et al. | 210/400 |
| 3,987,587 | 10/1976 | Miller | 49/482 |
| 4,150,516 | 4/1979 | Wemyss | 52/222 |
| 4,857,193 | 8/1989 | Clements et al. | 210/400 |

Primary Examiner—W. Gary Jones
Assistant Examiner—Mathew O. Savage
Attorney, Agent, or Firm—Watson, Cole, Grindle & Watson

[57] ABSTRACT

A side seal assembly adapted for use in a belt-type filtering device. The assembly comprises a hollow elongated holder having at least one open end and a longitudinal slot extending the length thereof. The assembly further includes a rod received within the holder, the rod being of a length approximately equal to the length of the holder and of cross-sectional dimensions greater than the slot of the holder, and a flexible curtain secured to the rod along its length and extending outwardly through the slot in the holder.

19 Claims, 2 Drawing Sheets

SIDE SEAL FOR A LIQUID FILTER DEVICE

BACKGROUND OF THE INVENTION

The present invention relates to a construction for a seal assembly, more particularly, to a side seal assembly for a liquid filter device, the assembly being relatively simple and inexpensive to manufacture, assemble and replace and which provides a reliable side seal for such a device during operation.

While the present invention will be discussed hereinafter with reference to its use in conjunction with a conveyor or belt type filtering device used for dewatering of materials such as sludge, it should be recognized that its use and application are not thereby so limited.

Belt-type or conveyor-type filtering devices used for the dewatering of sludge generally comprise an endless, liquid permeable conveyor belt supported in a generally horizontal position by a perforate or liquid pervious guide table. The belt is conventionally driven by a pair of horizontal rollers positioned at each end of the guide table, one or both of the rollers being driven by suitable means such as a motor. In operation of the device, sludge is deposited on the horizontal belt at one end of the device and as the belt travels along the guide table, water continually passes through the perforate belt to yield a dewatered sludge at the other end of the device.

In the construction of such devices, it has been common practice to provide what is known as a side seal assembly along the edge of the belt to help prevent sludge from entering the space between the lateral edge of the traveling belt and the upstanding side walls of the guide table which are provided to maintain or confine the sludge on the belt. Sludge which does enter this space tends to leak from the device and can in some cases interfere with the operation of the machinery for the device.

Conventional designs for such side seal assemblies are somewhat troublesome in that they do not entirely prevent leakage along the side of the belt. In addition, these conventional designs for a side seal assembly tend to wear quite rapidly under contact with the moving belt and sludge and once in a worn condition where replacement is necessary, Present a difficult maintenance problem in that they are difficult and time-consuming to remove and replace. The costs associated with replacement of the side seals can be significant not only in material and maintenance expenses but also in terms of downtime for the filter device.

SUMMARY OF THE INVENTION

It is therefore a feature of the present invention to provide a construction for a side seal assembly for a filtering device which provides good sealing characteristics for the space between the belt and the side walls of such a belt type filtering device.

It is another feature of the present invention to provide a side seal assembly for a filtering device which can be easily and simply constructed from a relatively inexpensive materials.

It is also a feature of the present invention to provide a side seal assembly for a filtering device which can be easily and simply installed on a device.

It is a further feature of the present invention to provide a side seal assembly for a filtering device which can be easily replaced when worn with minimal downtime for the device.

Briefly, in its broader aspects, the present invention comprehends a side seal assembly adapted for use in a belt-type filtering device, the assembly comprising a hollow elongated holder having at least one open end and a longitudinal slot extending the length thereof, a rod received within the holder, the rod being of a length approximately equal to the length of the holder and of cross-sectional dimensions greater than the slot of the holder, and a flexible curtain secured to the rod along its length and extending outwardly through the slot in the holder.

The present invention further comprehends a filtering device for the treatment of liquid containing materials, the device comprising an endless, liquid permeable conveyor belt supported on a horizontal surface of a guide table having generally upright walls for confining material to be treated onto said conveyor belt and at least one seal assembly mounted on one of the upright walls to help prevent material carried by the belt from entering the space between the lateral edge of the belt and the upright side wall of the guide table, the seal assembly comprising a hollow elongated holder having at least one open end and a longitudinal slot extending the length thereof, a rod received within the holder, the rod being of a length approximately equal to the length of the holder and of cross-sectional dimensions greater than the slot of the holder, and a flexible curtain secured to the rod along its length and extending outwardly through the slot in the holder.

Further features, objects and advantages of the present invention will become more fully apparent from a detailed consideration of the arrangement and construction of the constituent parts as set forth in the following description taken together with the accompanying drawings.

DETAILED DESCRIPTION OF THE PREFERRED EMBODIMENTS

Figure 1:
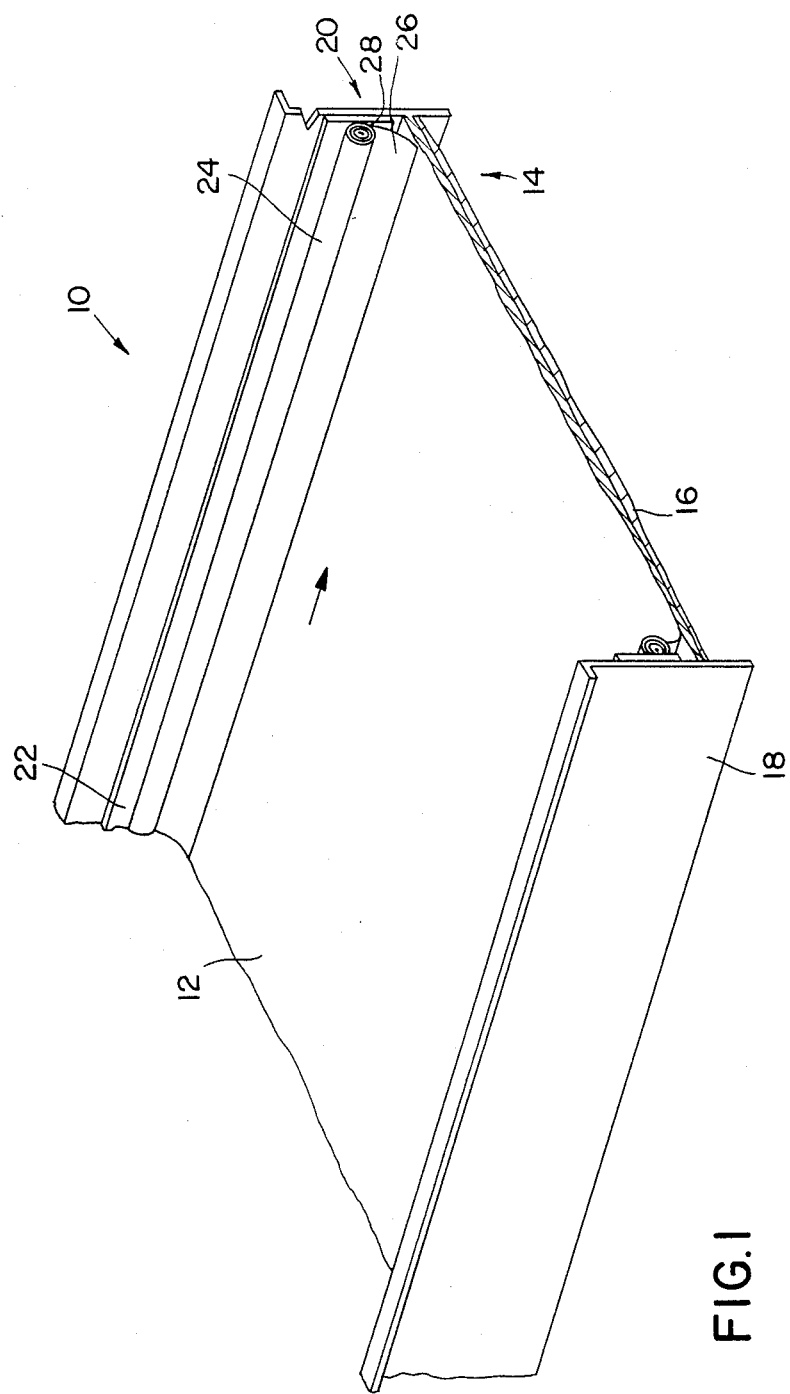
FIG. 1 is a perspective view of a seal assembly according to the present invention, the assembly being mounted on a conveyor type filtering device, only a portion of which is illustrated.

Turning first to FIG. 1, shown is a portion of a conveyor type filtering device 10 which comprises endless, liquid permeable conveyor belt 12 which is adapted to carry a liquid containing material such as sludge and allow the liquid to drain through the belt to yield a dewatered sludge. Belt 12 is driven by suitable means (not shown) such as one or more horizontally positioned rollers or the like. Conveyor belt 12 is supported by guide table 14 comprising liquid pervious bottom 16 and parallel upstanding side walls 18.

Mounted on each side wall 18 of guide table 14 is seal assembly generally designated as 20. Each seal assembly 20 in the embodiment shown comprises mounting plate 22 secured to side wall 18 and hollow holder 24 secured to the mounting plate.

Preferably, both mounting plate 22 and holder 24 are of a length approximately equal to the length of guide table 14 in the direction of movement of belt 12 as indicated by the arrow. Extending from holder 24 and secured thereto is curtain 26 of flexible fabric-like material which is generally impervious to liquids such as water. Curtain 26 of seal assembly 20 is of sufficient length that it tends to form a seal or dam between the lateral edge of belt 12 and corresponding side wall 18 to help prevent liquid containing material being carried by the belt from passing into and through the space formed between the edge of the belt and the side wall.

Figure 2:
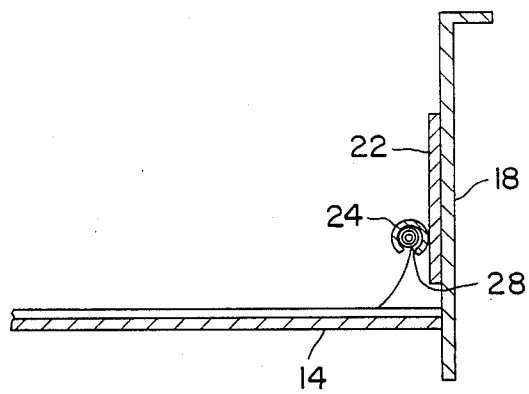
FIG. 2 is a partial cross-sectional view of a seal assembly and filtering device as shown in FIG. 1.
Figure 3:
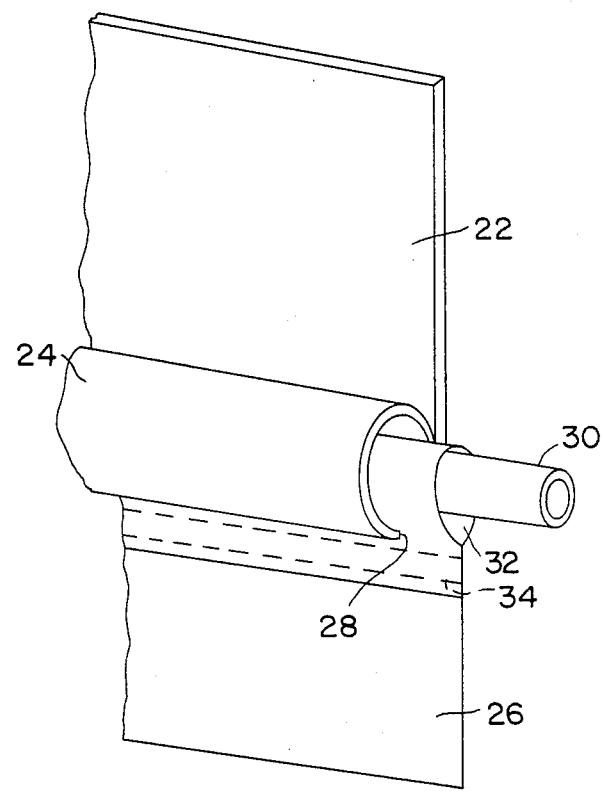
FIG. 3 is a partial perspective view of the end portion of one embodiment of a seal assembly according to the present invention, the components of the assembly being shown slightly separated for the purposes of clarity.

As is best shown in FIGS. 2 and 3, the components of assembly as shown in FIG. 3 having been slightly separated for clarity, holder 24 of seal assembly 20 in this embodiment is formed from a length of metal or like tubing having a generally circular cross-section and which is open on at least one end. Holder 24 has longitudinal slot 28 running along its entire length, the width of the slot being narrow in comparison with the diameter of the tubing forming the holder. Holder 24 is secured to mounting plate 22 by means such as tack welding and the like such that when the plate is mounted on side wall 18, slot 28 is directed downwardly.

Curtain 26 is secured to holder 24 by the provision of rod 30 which is of a width or diameter to easily fit within the tubing forming holder 24 and a dimension greater than slot 28. Curtain 26 is wrapped about rod 30 and secured to itself by means such as stitching 34 and the like so as form pocket 32. As is apparent, slot 28 is of a dimension such that rod 30 is securely maintained within holder 24 yet can allow the curtain to extend outwardly of the holder.

Referring back to FIG. 1, curtain 26 is of a length such that it extends the entire length of holder 24. In addition, curtain 26 is of a sufficient width such that it extends downwardly a sufficient distance to to provide an area of contact with the upper surface of belt 14 and thereby form a seal between the belt edge and upright side wall 18. With sufficient contact between curtain 26 and belt 14, seal assembly 20 helps prevent liquid containing material carried by the belt from entering the space between the edge of the belt and side wall 18.

Manufacture of seal assembly 20 as illustrated in the drawings can be accomplished by providing a suitably sized thin Plate of metal and the like for forming mounting plate 22. The tubing for forming holder 24 can be of conventional metal stock and longitudinal slot 28 can be formed therein by cutting, slicing and the like. It is generally good practice in forming the slot 28 to smooth and deburr the edges of tubing forming the slot to help prevent damage to curtain 26 extending therethrough. Rod 30 may be either of hollow or solid stock and is of a length approximately equal to that of holder 24. Preferably, for reasons of economy, rod 30 is formed from Polymeric material such as polyethylene.

Curtain 26, as was mentioned previously, is of a fabric-like material having draping characteristics which is generally impervious to liquids such as water. Polymeric fabic-like materials have been found to be particulary suitable for the curtains of the seal assemblies according to the invention, particularly polymeric materials such as polyesters formed into sheets and optionally having reinforcing materials such as fibers and the like contained therein. Curtain 26 is of also of a length approximating the length of holder 24 and of a width sufficient to extend from holder 24 and provide an area of contact with the conveyor belt. Curtain 26 may be formed by folding one longitudinal edge over on itself and securing it by stitching, heat welding and the like so as to form pocket 32. To complete the assembly of seal assembly 20, rod 30 is then inserted into pocket 32 and the rod and curtain 26 are then inserted into the end of holder 24.

In a preferred embodiment of seal assembly 20, curtain 26 is made from two different thicknesses of fabric, the portion of the curtain forming pocket 32 being thinner than the remainder of the curtain. With such a construction for curtain 26, insertion of the curtain into slot 28 is facilitated.

Installation of seal assembly 20 as shown in the drawings on conveyor type filtering device 10 is relatively straightforward and requries very little time in terms of downtime for the filtering device. The completed seal assembly 20 is simply positoned on side wall 18 such that curtain 26 hangs down sufficiently to contact belt 14 along its entire length and then plate 22 is secured to the side wall by means such as bolts, welding and the like. Once installed, holder 24 need not be removed for replacement of curtain 26 as replacement can be easily accomplished by removing the curtain and rod as unit and substituting a new curtain for the worn one. Reassembly of the seal assembly simply involves inserting the combination of the rod and curtain back into the holder.

As is apparent to those of skill in the art, seal assembly of the present invention provides many significant advantages in the operation and maintenance of a conveyor-type filtering device. More specifically, the seal assembly can be constructed of relatively inexpensive materials and can be easily constructed and assembled. In addition, seal assembly can be easily installed on new or existing filtering devices and should replacement of the curtain become necessary, the entire seal assembly need not be removed from the side wall of the device but the rod and curtain only need to be removed from the holder and the curtain then replaced. Furthermore, the seal asembly provides a more than adequate seal between the belt and the side wall of the filtering device to help prevent liquid containing material from entering the space between the belt edge and the side wall.

While there has been shown and described what is considered to be preferred embodiments of the present invention, it will be apparent to those skilled in the art to which the invention Pertains that various changes and modifications may be made therein without departing from the invention as defined in the appended claims.

It is claimed:

1. A side seal assembly adapted for sealing a side margin of a dewatering apparatus employing a liquid-permeable filter media, comprising a hollow elongated holder positioned at one side of said media and having a longitudinal slot extending the length thereof, a rod positioned within the holder, the rod being of a length approximately equal to the length of the holder and of cross-sectional dimensions greater than the slot of the holder, and a flexible curtain secured to said rod along its length and extending outwardly through the slot in the holder and into contact with said filter media at a side margin thereof.

2. A side seal assembly in accordance with claim 1, wherein the holder is round in cross-section.

3. A side seal assembly in accordance with claim 2, wherein the rod is round in cross-section.

4. A side seal assembly in accordance with claim 3, wherein the rod is a hollow tube.

5. A side seal assembly in accordance with claim 1, wherein the curtain is affixed to the rod by wrapping one side of the curtain about the rod.

6. A side seal assembly in accordance with claim 5, wherein the side of the curtain wrapped about the rod is secured to itself by stitching to form a pocket.

7. A side seal assembly in accordance with claim 1, wherein the curtain is of a fabric material of two different thicknesses, the portion of the fabric adjacent the rod being the thinner of the two.

8. A side seal assembly in accordance with claim 7, wherein the fabric of the curtain includes polyester.

9. A side seal assembly in accordance with claim 1, further including a mounting plate affixed to the holder.

10. A side seal assembly in accordance with claim 9, wherein the mounting plate is of a length approximately equal to the length of the holder.

11. A dewatering apparatus for the treatment of liquidcontaining materials, comprising an endless, liquid-permeable conveyor belt supported substantially horizontally on a guide having generally upright side walls for confining material being treated to said conveyor belt, and at least one seal assembly mounted on one of said side walls to help prevent material carried by the belt from entering the space between the lateral edge of the belt and said one side wall, said seal assembly comprising a hollow elongated holder having a longitudinal slot extending the length thereof, a rod positioned within the holder, the rod being of a length approximately equal to the length of the holder and of cross-sectional dimensions greater than the slot of the holder, and a flexible curtain secured to the rod along its length and extending outwardly through the slot in the holder and into contact with said belt at a side margin thereof.

12. A dewatering apparatus in accordance with claim 11, wherein the holder is round in cross-section.

13. A dewatering apparatus in accordance with claim 11, wherein the rod is round in cross-section.

14. A dewatering apParatus in accordance with claim 13, wherein the rod is a hollow tube.

15. A dewatering apparatus in accordance with claim 11, wherein one end of said holder is open for insertion of said rod therewithin.

16. A dewatering apparatus in accordance with claim 11, wherein the curtain is affixed to the rod by wrapping one side of the curtain about the rod.

17. A dewatering apparatus in accordance with claim 11, wherein the curtain is of a fabric material of two different thicknesses, the portion of the fabric adjacent the rod being the thinner of the two.

18. A dewatering apparatus in accordance with claim 11, further including a mounting plate affixed to the holder, said mounting plate being secured to one of said sidewalls.

19. A dewatering apparatus in accordance with claim 18, wherein said mounting plate is of a length approximately equal to the length of the holder.

* * * * *